United States Patent
Okazaki et al.

(10) Patent No.: US 7,398,596 B2
(45) Date of Patent: Jul. 15, 2008

(54) PRODUCTION METHOD OF WATER JACKET SPACER

(75) Inventors: Nobumitsu Okazaki, Okayama (JP); Yoshihiro Takaya, Okayama (JP); Takashi Matsutani, Toyota (JP); Takanori Nakada, Toyota (JP); Makoto Hatano, Aichi (JP); Takashi Kubota, Aichi (JP)

(73) Assignees: Uchiyama Manufacturing Corp., Okayami-shi, Okayama (JP); Toyota Jidosha Kabushiki Kaisha, Toyota-shi, Aichi (JP); Alsan Kogyo Kabushiki Kaisha, Obu-shi, Aichi (JP)

( * ) Notice: Subject to any disclaimer, the term of this patent is extended or adjusted under 35 U.S.C. 154(b) by 625 days.

(21) Appl. No.: 10/951,789

(22) Filed: Sep. 29, 2004

(65) Prior Publication Data

US 2005/0120653 A1 Jun. 9, 2005

(30) Foreign Application Priority Data

Sep. 29, 2003 (JP) ............................. 2003-337916

(51) Int. Cl.
*B23P 11/00* (2006.01)
(52) U.S. Cl. ............................. 29/888.061; 29/888.06; 29/418; 29/527.1; 264/334
(58) Field of Classification Search ............ 29/888.061, 29/423, 418, 527.1; 264/328.1, 328.3, 328.12, 264/334, 336
See application file for complete search history.

(56) References Cited

U.S. PATENT DOCUMENTS 5,794,591 A * 8/1998 Kalebjian et al. ............ 123/337
6,581,550 B2 * 6/2003 Shinpo et al. ............. 123/41.74

OTHER PUBLICATIONS

Patent Abstract of Publication No. 2002-266695.
Patent Abstract of Publication No. 2002-303137.
Patent Abstract of Publication No. 2002-030989.
Patent Abstract of Publication No. 2002-021632.
Patent Abstract of Publication No. 2002-013440.

* cited by examiner

*Primary Examiner*—David P. Bryant
*Assistant Examiner*—Sarang Afzali
(74) *Attorney, Agent, or Firm*—Bacon & Thomas, PLLC

(57) ABSTRACT

A production method of a water jacket spacer for use in a cylinder block with a water jacket formed around plural cylinder bores. The method comprises the fist step of integrally forming a tubular spacer body with a peripheral wall and a connecting bridge by way of synthetic resin molding so that corresponding regions of the peripheral wall are connected to each other via the connecting bridge, and the second step of cooling the tubular spacer body, with the connecting bridge fixed thereto, to prevent deformation of the tubular spacer body during the cooling process, and the third step of removing the connecting bridge from the tubular spacer body.

6 Claims, 9 Drawing Sheets

PRODUCTION METHOD OF WATER JACKET SPACER

FIELD OF THE INVENTION

The present invention relates to a production method of a spacer adjusting section of a cooling water passage, which is inserted in a water jacket of a cylinder block in a combustion chamber, namely a production method of a water jacket spacer.

PRIOR ART

An open deck type cooling mechanism is known as a construction for cooling a cylinder block in a combustion chamber. It is constructed such that a water jacket which is ellipse or ellipse with constrictions along the circumference of the cylinder bore of the cylinder block is formed and a cooling water is circulated through the water jacket to cool down an engine. In this case, the cooling water flows in a direction substantially orthogonal to a reciprocating movement of a piston in the water jacket.

However, a cylinder block is generally made of a cast metal and a water jacket is usually formed with a cantilever type mold called "core" because of its mold construction for casting. In order to ensure the mold strength of the core, the water jacket is required to be cast with a larger width than the necessary width. Therefore, the sectional area of the water jacket tends to be excessive relative to the necessary cooling water.

A method has been adopted such that a spacer formed so as to be adaptable to the water jacket is inserted into the water jacket, and the sectional area of the water jacket is reduced to form an appropriate cooling water passage. The method disclosed in JP-A-2002-266695 has been known as a production method of a water jacket spacer for use in a cylinder block having plural cylinder bores and a water jacket formed around the cylinder bore.

The water jacket spacer is shaped like a substantial long circle with a peripheral wall formed with constricted portions and surrounding serial cylinder bores, so as to be inserted into a water jacket, as shown in FIG. 2 of JP-A-2002-266695. The spacer is generally made of synthetic resin formed by injection molding. Under the production process of injection molding, them molded product keeps its shape while the temperature is gradually lowered from a high temperature at the time of injection molding after separated from the mold. The long circular spacer is deformed because of the misalignment of thermal contraction caused by its figuration characteristic during the gradual cool down.

The deformed water jacket spacer isn't inserted into the water jacket as it is, so that installation operation while holding the deformed portion is required, thereby deteriorating the operation ability. Therefore, the spacer has been cooled down and cured while being set with a reforming tool after injection molding so as not to be deformed, thus stabilizing its dimension to keep its shape.

However, according to such a method, the process for setting the water jacket spacer with the jig is increased and a number of jigs are required to be prepared. Therefore, there arises many problems for production such that the cost is increased and the setting space is required, therefore, there is room for further improvement.

SUMMARY OF THE INVENTION

The problem to be solved in the present invention is to prevent deformation of a water jacket spacer during the gradual cool down after molding without using a jig or at a low cost by devising a production process of a spacer for water jacket and to improve its production ability.

According to the present invention, a production method of a water jacket spacer for use in a cylinder block with a water jacket formed around plural cylinder bores, comprises; integrally forming a tubular spacer body with a peripheral wall surrounding a spacer opening and connecting bridge by way of synthetic resin molding so that corresponding regions of the peripheral wall are connected to each other via the connecting bridge, thereafter cooling the tubular spacer body with the connecting bridge fixed thereto, thereby preventing deformation of the tubular spacer body during the cooling process, and removing the connecting bridge from the tubular spacer body.

Further according to the present invention, the above-mentioned production method of a spacer is characterized in that the connecting bridge is formed at an intermediate position inside the peripheral wall so as to bridge the corresponding portion of the inner surface of the peripheral wall.

Further according to the present invention, the above-mentioned production method of a spacer is characterized in that the peripheral wall has a constricted portion therearound and that the connecting bridge is formed in the inner surface of the peripheral wall corresponding to the constricted portion.

Still further according to the present invention, the above-mentioned production method of a spacer is characterized in that the connecting bridge is comprised of a runner which is coincidentally made during the process of synthetic resin molding of the tubular spacer body.

Next the effects of the present invention are described.

According to the production method of a water jacket spacer of the present invention, a tubular spacer body and a connecting bridge that connects corresponding regions of the peripheral wall are integrally formed by way of synthetic resin molding and are cooled down in the correct shape during the cooling process, then the connecting bridge is cut off. Consequently deformation of the water jacket spacer caused by the difference of heat contraction inside or outside thereof is effectively prevented.

In addition, the rigidity of spacer is highly improved because the peripheral wall is connected with the connecting bridge. In a case of resin molding of the spacer using a mold, the inferior releasability of the spacer from the mold, which is derived from the deformation (deflection or twist) of the spacer, is improved. In other words, the mold and the spacer are smoothly separated, resulting in an improvement of its productivity.

The connecting bridge is cut off after the shape of a molded spacer is specified, so that a suitably formed water jacket spacer with the hollow cylindrical spacer body with a predetermined shape is obtained. Therefore, a jig for stabilizing shape and a procedure for detaching and attaching the jig are not required and further a space for plural jigs is not required. As a result, a prevention of deformation during the cooling process after resin molding is easily done with a simple equipment at a low cost such that the connecting bridge is cut off with a tool like a nipper, thereby achieving lower cost and improving the productivity.

Further according to the production method of the water jacket spacer of the present invention, the connecting bridge connects the intermediary portions of the spacer opening, namely the delicate and easily deformed portions. Therefore, the less connecting bridges can effectively reinforce the spacer, so that the effect mentioned above is more effectively achieved.

Still further according to the production method of the water jacket spacer of the present invention, the tubular spacer body has peripheral wall with a constricted portion and the connecting bridge is formed in the inner surface of the peripheral wall corresponding to the constricted portion. The connecting bridge is formed as a minimum structure by connecting the closest portions, thereby promoting downsizing of the molding facility, promoting to economize the expenditure of resin material and improving the productivity.

Still further according to the production method of the water jacket spacer of the present invention, the connecting bridge is comprised of a runner that pours the melted resin into the gate of the cavity during the process of synthetic resin molding of the tubular spacer body. Therefore, the runner inevitably produced by molding becomes the connecting bridge. As a result, a water jacket spacer which is accurately shaped is provided and the material efficiency and the productivity are improved.

DETAILED DESCRIPTION OF THE INVENTION

Here is a water jacket spacer having a capable shape to be inserted into the water jacket of an engine with three-cylinder that has two constricted portions at each long side wall surrounding in-line bores. Two connecting bridges that connect the constricted portions of the spacer are integrally formed.

Embodiment 1

Figure 1:
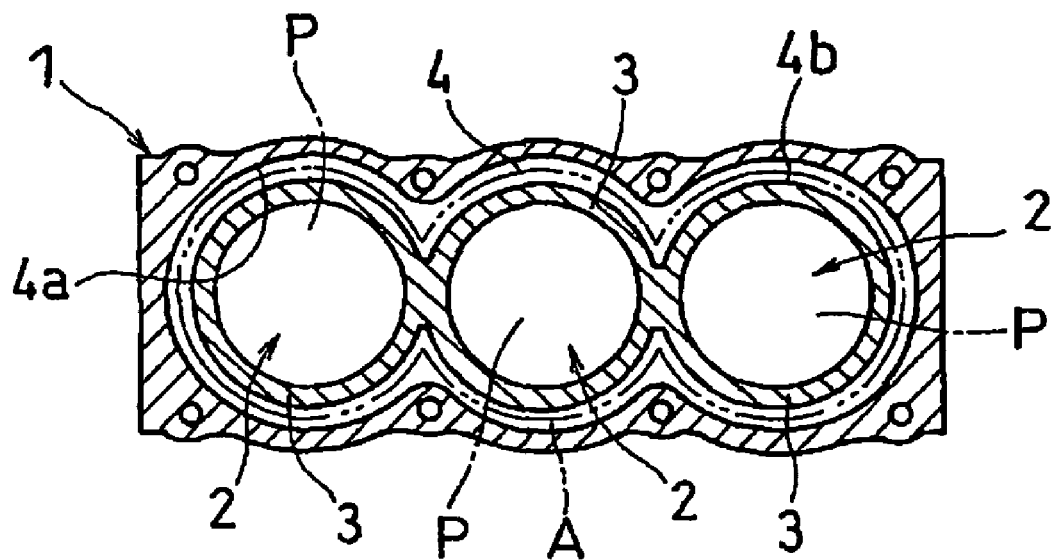
FIG. 1 is a plane view of a cylinder block for vehicle.
Figure 2:
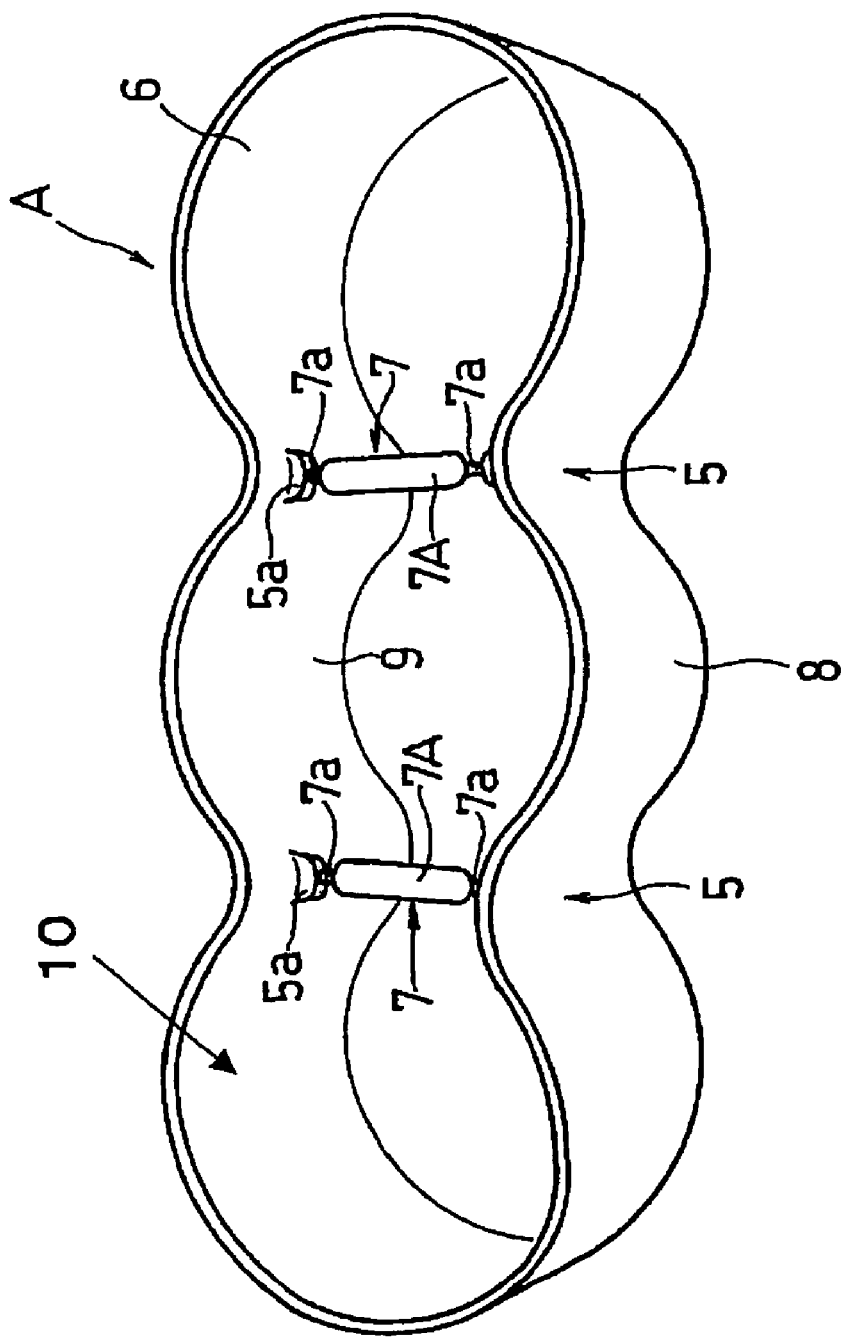
FIG. 2 is a perspective view of a water jacket spacer.
Figure 3:
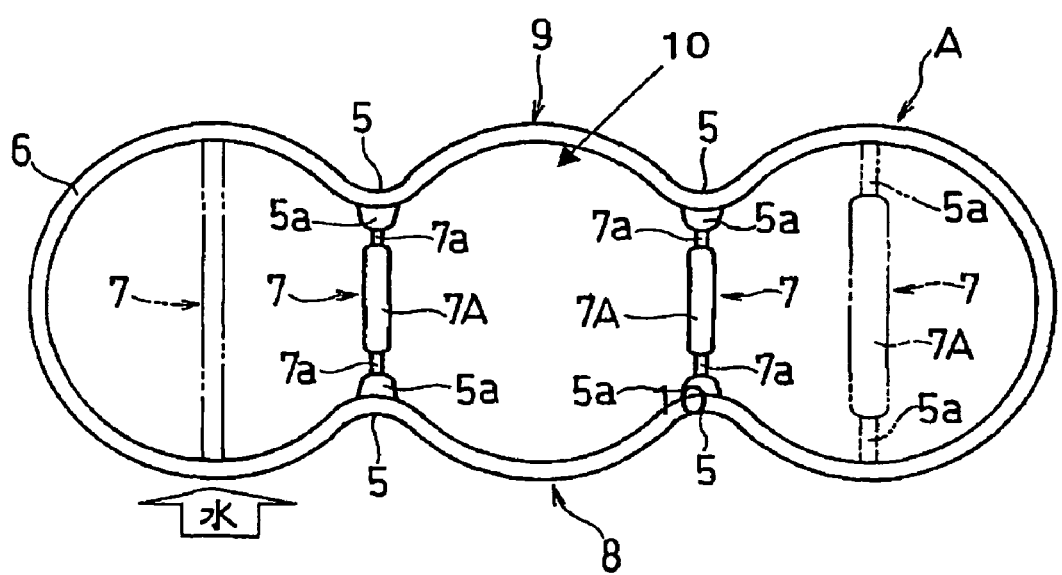
FIG. 3 is a plane view of a water jacket spacer.
Figure 4:
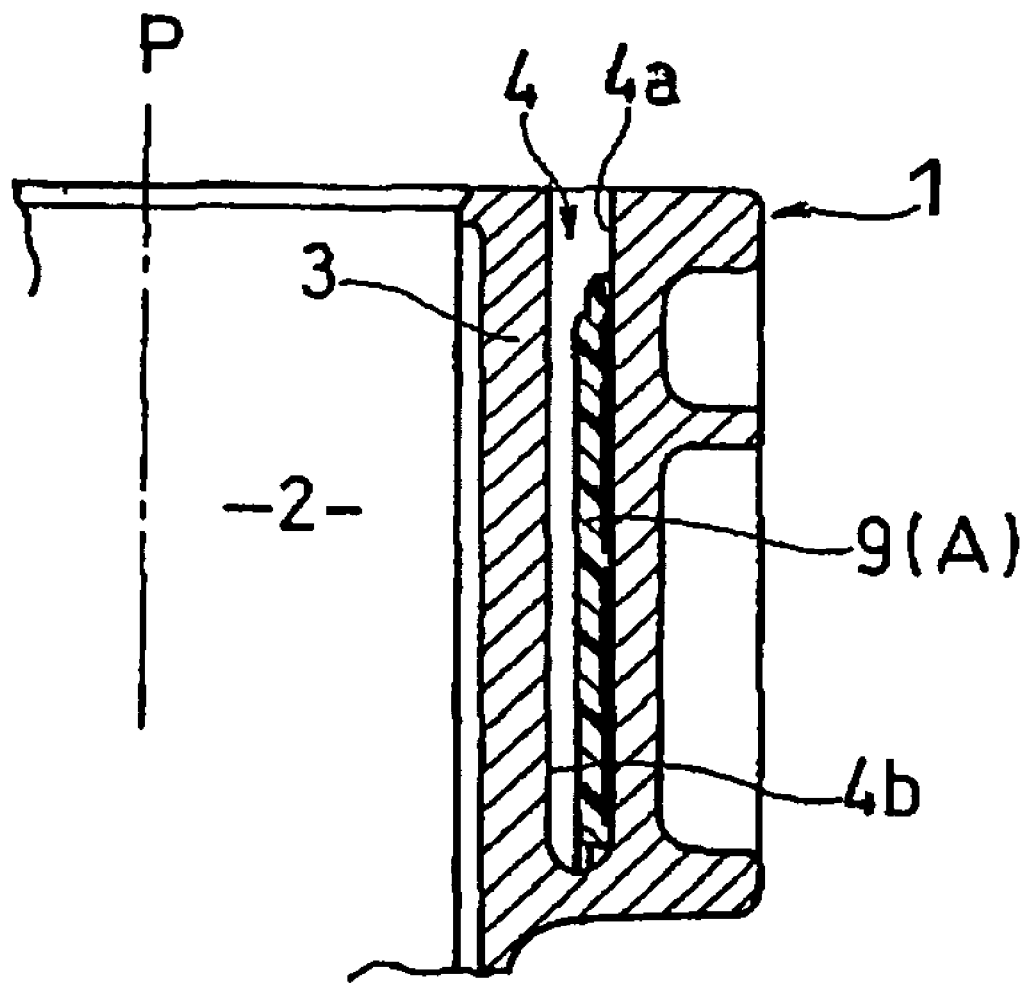
FIG. 4 is a sectional view along the second longer wall part of a cylinder block.
Figure 5:
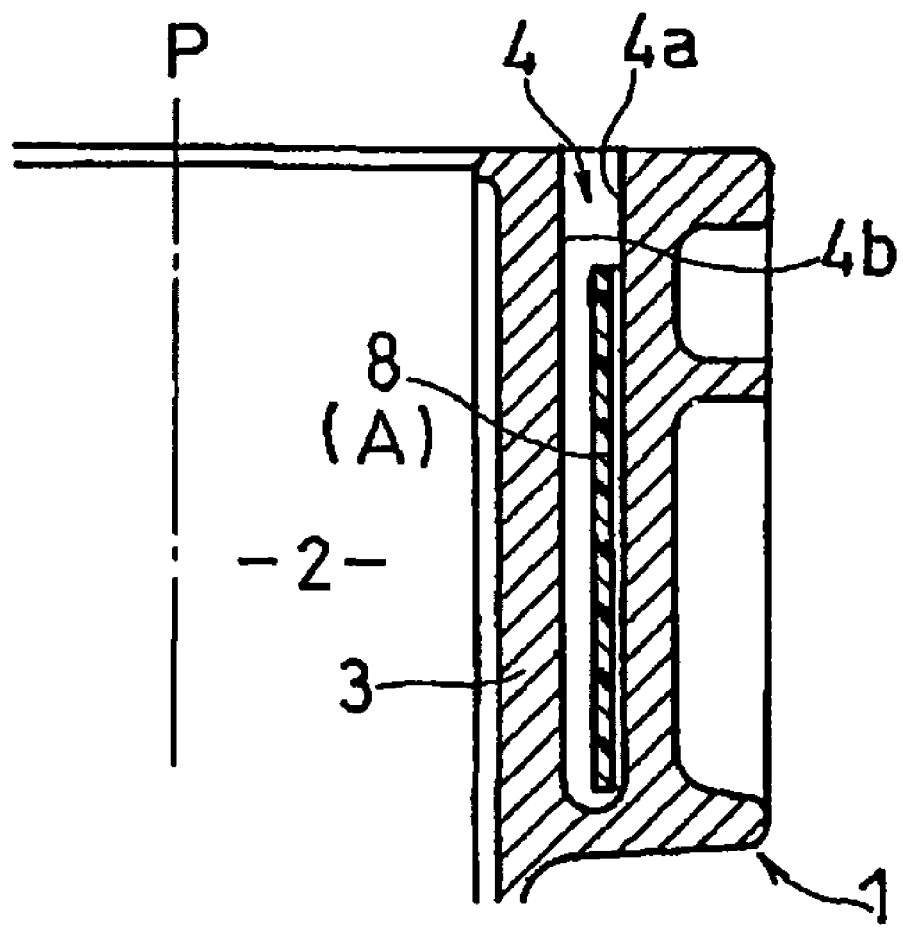
FIG. 5 is a sectional view along the first longer wall part of a cylinder block.

FIG. 1 shows a plane view of a cylinder block, FIG. 2 and FIG. 3 show a water jacket spacer A (referred to a spacer hereinafter) according to the present invention, FIG. 4 and FIG. 5 show a partial sectional view of a cylinder block 1 in which a spacer is inserted in a water jacket. Further as shown in FIG. 2, the bridges are formed at an intermediate positions inside the peripheral wall surrounding a spacer opening 10.

The cylinder block 1 for automobile engine is made of cast metal and has three cylinder bores 2. An roughly oval shaped cylindrical water jacket 4 with two constricted portions at the positions of the long circumference wall of a cylinder tube 3 that surrounds cylinder bores 2 aligning in a line. The water jacket 4 is inserted with the spacer A which is made of synthetic resin and is formed like an roughly oval corresponding to the plane shape of the water jacket 4 (seen from the direction P which is the center of the cylinder bore 2) in order to make the amount of cooling water appropriate by reducing the sectional area.

The water jacket 4 has a sectional shape which narrowly and deeply gets through from the upper surface of the cylinder block 1 as shown in FIG. 1, FIG. 4 and FIG. 5. The spacer A is inserted so as to occupy a part of the sectional area. Namely, the water jacket 4 is in the form of a single peripheral wall (outer shape such that three circles are connected to be communicated) so as to surround the three cylinder tubes 3 closely arranged in lateral direction when it is seen from the top. The spacer A is designed such that a clear cooling water flow passage is formed between a periphery wall 4a and an inner circumference wall 4b when the spacer A is inserted in the water jacket 4.

The spacer A is formed by injection molding as shown in FIG. 1 -FIG. 3 and is made of synthetic resin, comprising a tubular spacer body 6 (refereed to the main body hereinafter) having a pair of wavy longer wall sides 8, 9 (portion of a peripheral wall) that forms the peripheral wall surrounding the spacer opening 10 and having two constricted portions 5 of each wavy longer wall sides 8, 9 so as to be inserted in the water jacket 4, and comprising a connecting bridge 7 connecting the two intermediary portions of the main body 6, namely the constricted portions 5. The connecting bridge 7 formed at the intermediary portions in a height direction of the space A is constructed with a pair of narrow connections 7a connecting a wide connecting bridge main body 7a and a claw 5a following the construction 5 and the connecting bridge 7 keeps an appropriate distance between the pair of wavy longer wall sides 8 and 9.

As shown in FIG. 3, the connecting bridge 7 may be constructed such that the claw 5a is not provided (shown at the right side in FIG. 3) or may be constructed such that connecting parts 7a are not provided to form a waistless shape with the same width (shown at the left side in FIG. 3). Otherwise, the connecting bridge 7 may connect the parts other than the constricted portions 5, like the most apart portions of the pair of wavy longer wall sides 8 and 9.

The spacer A with connecting bridge 7 shown in FIG. 2 and FIG. 3 is a semi-finished product. A completed spacer A to be inserted in the water jacket 4 is in the state indicated by dotted lines in FIG. 1 such that a pair of connecting bridges 7 are cut off at the boundary between both connecting parts 7a and the claws 5a respectively when the connecting bridges 7 keep the shape of spacer A after a predetermined adequate cooling time after molding.

On the other hand, the connecting bridges 7 are cut off after the spacer A is naturally cooled down sufficiently to keep its form (stabilized) after injection molding. The four claws 5a (see FIG. 2 and FIG. 3) are functioned as a chuck in case of automatic assembly and also served to keep the space between the inner circumferential wall 4b of the water jacket 4.

Embodiment 2

The spacer A may be constructed such that a runner produced in case of injection molding of the main body 6 is used as a connecting bridge 7. Such a spacer A is diagrammatically shown in FIG. 6-FIG. 9.

Figure 6:
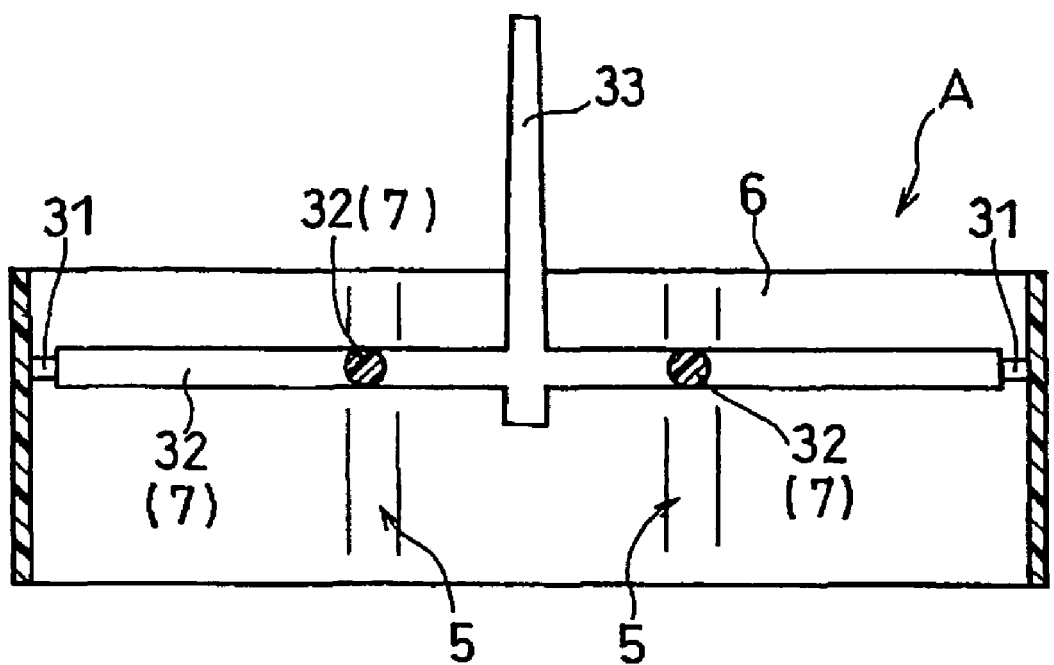
FIG. 6 is a plane view of a water jacket spacer whose connecting bridge is comprised of a runner.
Figure 7:
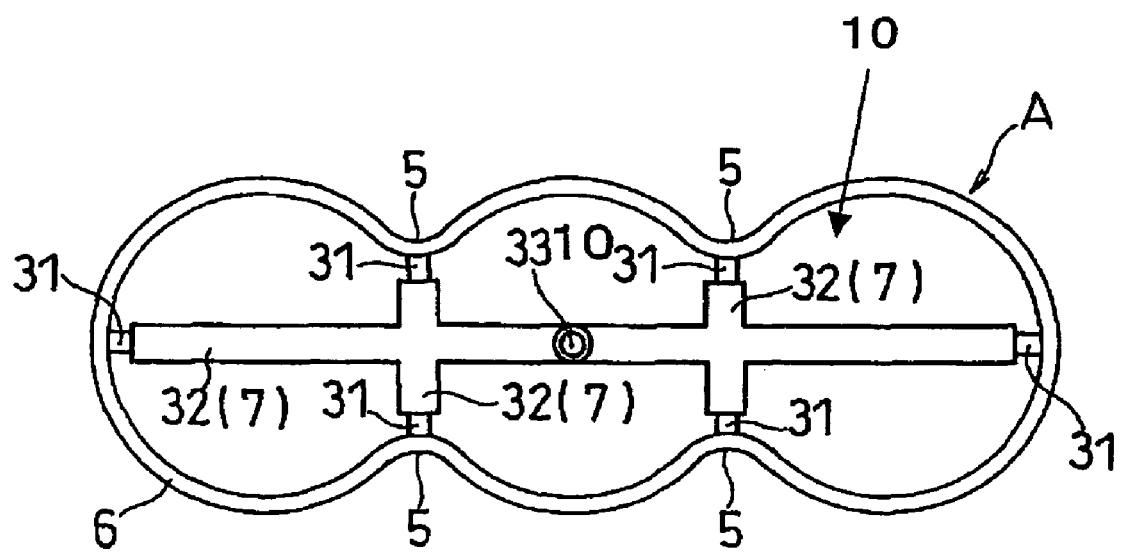
FIG. 7 is a sectional side view of the water jacket spacer shown in FIG. 6.

<1> FIG. 6 and FIG. 7 show a spacer A having a gate 31 for pouring melt resin material (melt synthetic rein material) into a mold (not shown) at six positions, namely both ends of the main body 6 in longitudinal direction and each constricted portion 5. Three runners 32 connecting each opposing gate 31 among six gates 31 are integrated and are not cut off after molding, thereby being functioned as the connecting bridge 7. Sprue 33 for introducing the injected melt resin material into the runner 32 is provided at the center of the long runner 32 connecting the both ends of the main body 6 in a longitudinal direction.

Thus, the both ends of the peripheral wall are connected with the connecting bridge 7 to keep the shape of spacer A in addition to the two connecting bridge 7 connecting the constricted portions 5 and the connecting bridges 7 (namely the runner 32) are cut off after stabilizing the spacer A, thereby obtaining a spacer with a superior configuration accuracy to the spacer A shown in FIG. 2. The runner 32 and the sprue 33 which are made in case of molding are left as the connecting bridge 7 (the timing for cutting is delayed after stabilization), thereby providing a water jacket spacer and its production method in which an exclusive connecting bridge 7 is not required and its productivity and material efficiency are superior.

Figure 8:
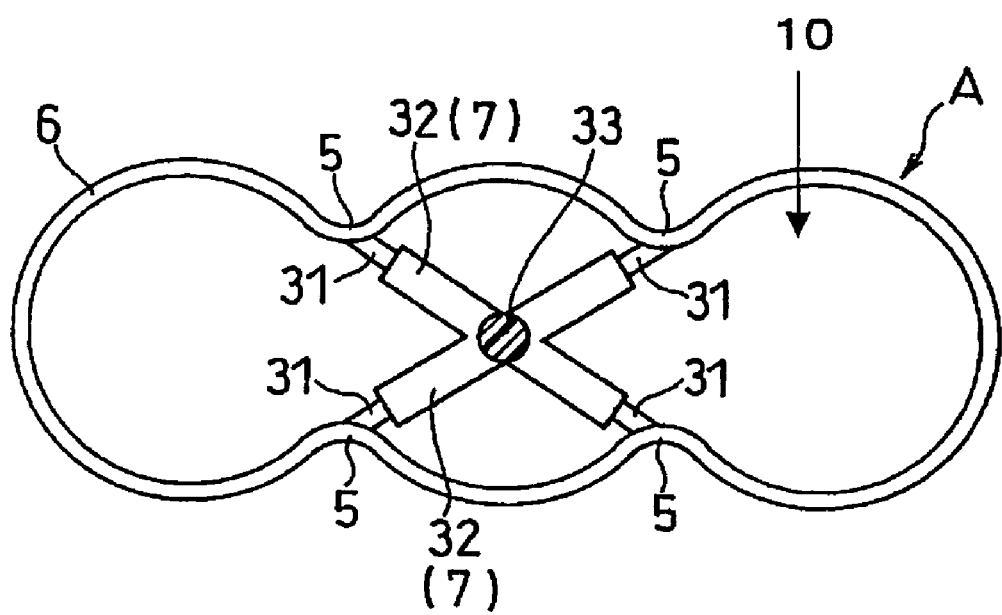
FIG. 8 is a plane view of a water jacket spacer whose connecting bridge is constituted as an X-shaped.

<2> The spacer A shown in FIG. 8 has a gate 31 at four positions of the constricted portion 5 and the runner 32 connecting each gate 31 is crossed to form a connecting bridge 7 like a letter "X". In this embodiment, a sprue 33 is provided at the intersection of each runner 32.

Figure 9:
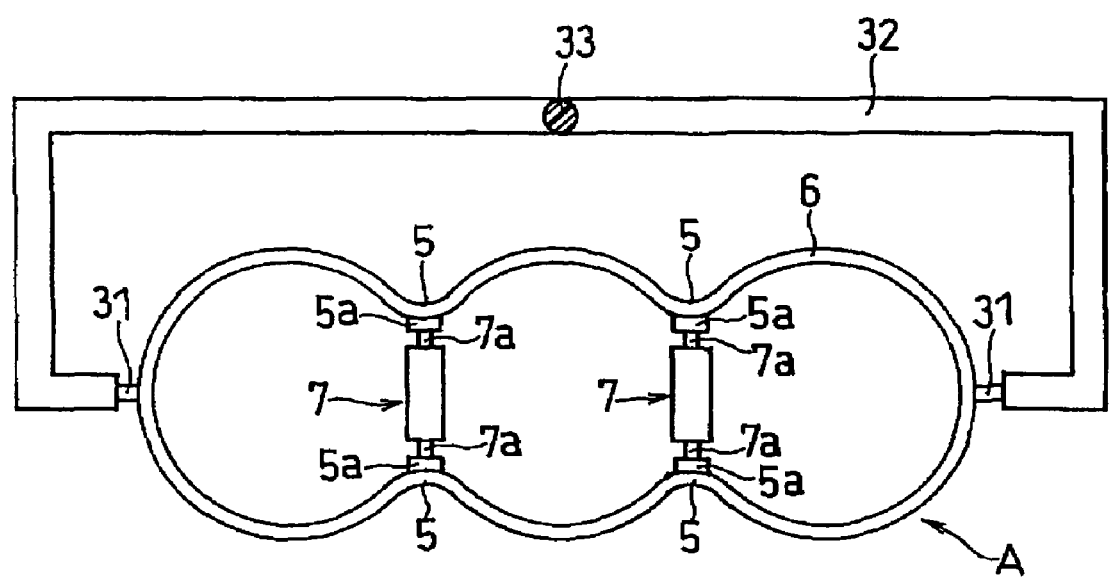
FIG. 9 is a plane view of a water jacket spacer whose connecting bridge is comprised of a runner passing outside of a main body.

<3> The spacer A shown in FIG. 9 is an embodiment in which a gate and a runner are not arranged in the inside of the peripheral wall of the main body 6. In addition to the connecting bridge 7 shown in FIG. 2, the gates 31 provided outside of both edges of the main body 6 in longitudinal direction are connected with a bent runner 32 formed outside of the main body 6 as shown in FIG. 9, thereby serving as a connecting bridge 7.

The spacer A according to the present invention can be applicable to a spacer that is inserted in an open deck type water jacket of a cylinder block with plural connected cylinder bores. Also the present invention can be applied to an oval spacer and its production method, which is preferable to an oval water jacket without or almost without constricted portions 5.

The invention claimed is:

1. A production method of a water jacket spacer for use in a cylinder block with a water jacket formed around plural cylinder bores, comprising the steps of:
   integrally forming a tubular spacer body of the water jacket spacer with a peripheral wall surrounding a spacer opening and a connecting bridge by way of synthetic resin molding so that corresponding regions of said peripheral wall of the water jacket spacer are connected to each other via said connecting bridge:
   thereafter cooling said tubular spacer body, with said connecting bridge fixed thereto, thereby preventing deformation of said tubular spacer body during the cooling process; and
   removing said connecting bridge from said tubular spacer body.

2. The production method of a water jacket spacer of claim 1, wherein said connecting bridge is formed at an intermediate position inside said peripheral wall so as to bridge the corresponding portion of the inner surface of said peripheral wall.

3. The production method of a water jacket spacer of claim 2, wherein said peripheral wall has a constricted portion therearound and wherein said connecting bridge is formed in the inner surface of said peripheral wall corresponding to said constricted portion.

4. The production method of a water jacket spacer of claim 3, wherein said connecting bridge is comprised of a runner which is coincidentally made during the process of synthetic resin molding of said tubular spacer body.

5. The production method of a water jacket spacer of claim 2, wherein said connecting bridge is comprised of a runner which is coincidentally made during the process of synthetic resin molding of said tubular spacer body.

6. The production method of a water jacket spacer of claim 1, wherein said connecting bridge is comprised of a runner which is coincidentally made during the process of synthetic resin molding of said tubular spacer body.

* * * * *